United States Patent [19]

Engle

[11] Patent Number: 5,226,861

[45] Date of Patent: Jul. 13, 1993

[54] AUTOMOTIVE DIFFERENTIAL WITH REDUCED SLIP

[75] Inventor: James L. Engle, Auburn, Ind.

[73] Assignee: Auburn Gear, Inc., Auburn, Ind.

[21] Appl. No.: 897,766

[22] Filed: Jun. 12, 1992

[51] Int. Cl.⁵ .............................................. F16H 1/44
[52] U.S. Cl. ..................................... 475/234; 475/235
[58] Field of Search .............................. 475/234, 235

[56] References Cited

U.S. PATENT DOCUMENTS 3,053,114  9/1962  Singer ................................. 475/234
3,906,812  9/1975  Kagata ................................ 475/235

Primary Examiner—Dirk Wright
Attorney, Agent, or Firm—Pearne, Gordon, McCoy & Granger

[57] ABSTRACT

A limited slip differential for an axle system of a vehicle is disclosed which includes internal clutches for connecting a slipping wheel to the drive input of the differential. The differential is also responsive to inertia forces on the vehicle during hard cornering to prevent slippage of the inside wheel during cornering.

5 Claims, 2 Drawing Sheets

AUTOMOTIVE DIFFERENTIAL WITH REDUCED SLIP

BACKGROUND OF THE INVENTION

This invention relates to limited slip differential mechanisms and, more particularly, relates to limited slip differential mechanisms for use in high performance automotive axle systems to eliminate wheel slippage during hard cornering maneuvers.

Automotive differentials having limited slip capabilities generally comprise clutch mechanisms which are operable to connect the differential casing to an output shaft to resist differential action in response to a loss of resistive torque bias at an output shaft. Such a differential mechanism is disclosed in U.S. Pat. No. 3,400,611 to Engle. Common open differentials provide driving torque to the wheels and permit those wheels to turn at a differential rate on cornering when the wheels have traction. If one of the wheels looses traction, however, all of the drive torque is transferred to the slipping wheel. According to the Engle patent, transmission of torque from the pinion gears to the side gears creates separating forces urging the side gears axially outwardly in a direction away from the pinion shaft. These forces are transferred to cone-shaped clutch members to increase frictional engagement of the clutch members with drum surfaces of the differential casing to provide a direct path for transmission of rotational effort to the output shaft to which the clutch member is associated.

While conventional limited slip differentials perform adequately under normal driving conditions, and particularly, in those situations where one of the driving wheels encounters ice or mud, these differentials are not ideally suited for racing maneuvers involving hard cornering. During hard acceleration through a tight turn, the weight transfer to the outside wheel is great enough to greatly reduce the tractive effort of the inside wheel. In this situation, a portion of the input torque will be transferred to the differential clutch, and if the clutch loading is insufficient, the inside wheel will spin.

SUMMARY OF THE INVENTION

The present invention provides a mechanism which overcomes the problem of wheel slippage under hard cornering conditions. According to this invention, the differential casing is translatable relative to the output shafts in opposite directions along the axis of the shafts and relative to at least some of the gear elements contained in the casing. During a cornering maneuver, therefore, the output shaft, which is on the outside of the turn, is forced against the pinion shaft, which is permitted to move in a lateral direction, so that lateral thrust is transferred by the pinion gears to the side gears to increase the loading of the clutch. According to a preferred aspect of this invention, the translation of the pinion shaft is accomplished by elongating the pinion shaft mounting hole in the casing slightly in the direction of the output shafts.

More specifically, this invention provides a limited slip differential for an axle system which includes first and second coaxially aligned rotatable output shafts, including spaced apart ends. A hollow differential casing, including a pair of axially aligned apertures, receives the output shafts and defines an internal cavity surrounding the juxtaposed ends of the output shafts. A beveled gear system, which includes side gears mounted on the output shafts and beveled gears which engage the side gears, is provided within the housing cavity. A clutch mechanism, which may include cone clutches, is disposed within the cavity, and which is adapted to selectively connect each of the output shafts to the differential casing to resist differential action in response to a loss of resistive torque bias at an output shaft. The casing is translatable relative to the output shafts, in opposite directions, along the axis of the shafts and relative to at least some of the gear elements in the casing. The clutch is also adapted to selectively connect each of the output shafts to the casing to resist differential action in response to translation of the casing relative to the output shafts upon inertia loading of the casing relative to the output shafts. The inertia loading of the casing is a direct result of the vehicle inertia transferred through the axle housing to the differential casing. Thus, the differential, according to this invention, is adapted to perform normal limited slip operations associated with situations wherein a ground engaging wheel encounters mud or ice, and is also adapted to respond to hard cornering situations which would tend to lift the inside wheel.

DETAILED DESCRIPTION OF THE DRAWINGS

Figure 1:
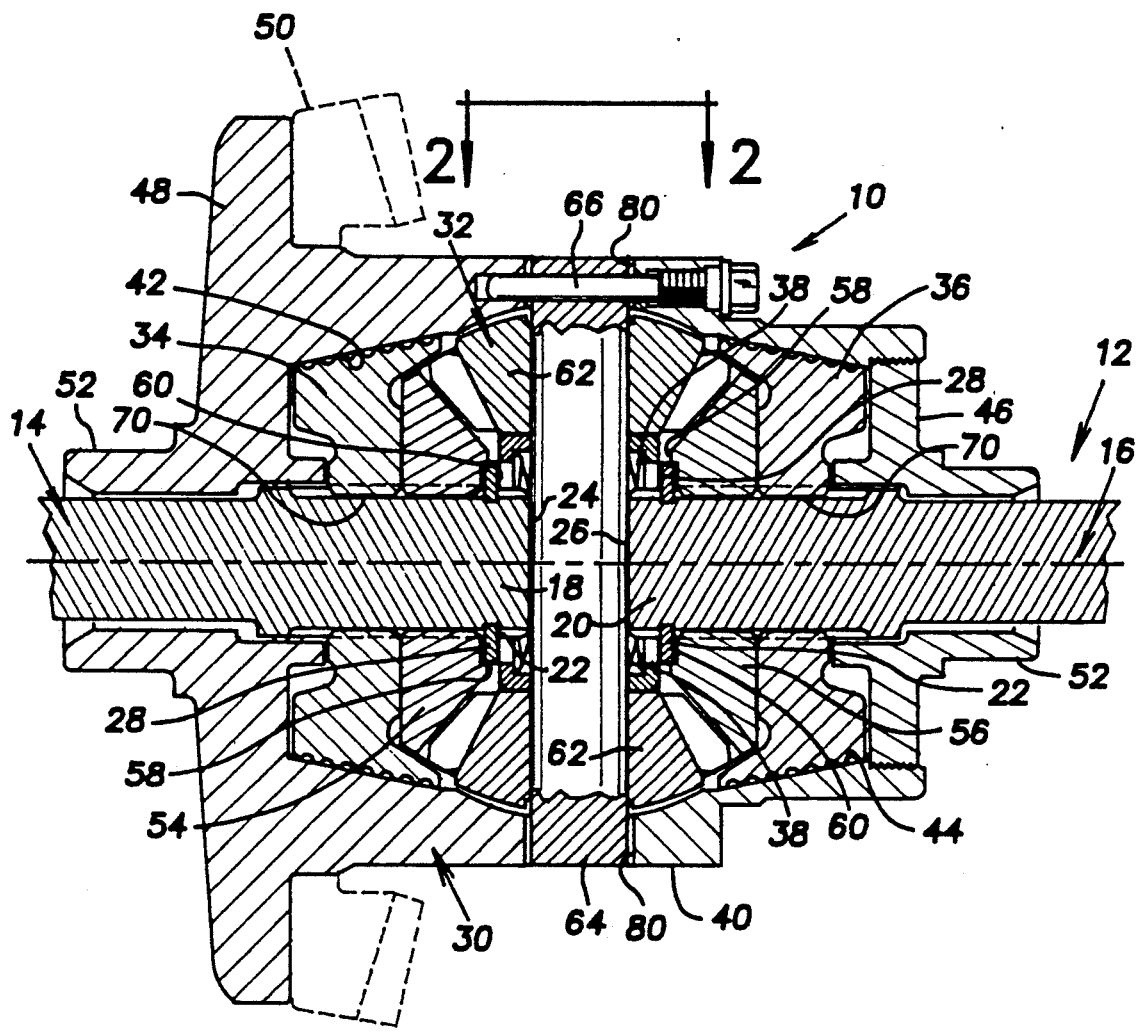
FIG. 1 is a cross-sectional view of a limited slip differential, according to this invention.
Figure 2:
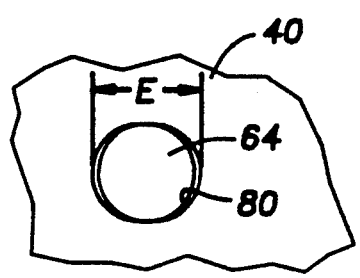
FIG. 2 is an end view of the pinion shaft mounted in the differential, the plane of the view being indicated by the line 2—2 in FIG. 1.

Referring now to the drawings and, particularly, to FIGS. 1 and 2, there is illustrated a differential mechanism 10, according to this invention. The differential mechanism 10 is associated with an axle system 12 of a vehicle, which includes a pair of coaxially aligned output shafts 14 and 16, which terminate in splined ends 18 and 20, respectively, disposed internally of the mechanism 10 and in juxtaposed spaced apart relation. Each splined end 18 and 20 includes a groove 22 formed near an end face 24 and 26 of the shafts 14 and 16. A restraining member in the form of a generally flat, split washer 28 is disposed in each of the grooves 22 to prevent axial movement of the output shafts 14 and 16 outwardly of the mechanism 10, as will be explained.

The mechanism 10 includes a casing 30 adapted to receive rotational effort from the drive shaft (not shown) of a vehicle for transmission to the output shafts 14 and 16 of the axle system 12. A bevel gear system 32 is disposed interiorly of the casing 30 and is operably connected between the casing and the output shafts 14 and 16 to transmit rotational effort to the shafts and simultaneously allow relative movement between the shafts when necessary, as when the vehicle is cornering.

First and second cone clutches 34 and 36 are also positioned within the casing and are respectively splined to the output shafts 14 and 16 and cooperate with the casing 30 to resist free differential action. A biasing mechanism, which includes springs 38, is disposed within the casing and is operatively associated with the clutches 34 and 36 to urge them into a predetermined frictional engagement with the casing 30 to provide an initial resistance to differentiation. The biasing mechanism is shown in greater detail in copending application Ser. No. 753,442, filed Aug. 30, 1991 (now U.S. Pat. No. 5,139,467, granted Aug. 18, 1992).

The casing 30 includes a main housing 40 having an internal cavity which defines conical surfaces 42 and 44 respectively engaged by the clutches 34 and 36. The housing 40 is closed at one end by a threaded end cap 46. The housing 40 is provided with a flange 48 secured to a ring gear 50 which is illustrated in phantom outline and which is adapted to receive rotational effort from the vehicle drive shaft.

The housing 40 and the end cap 46 each includes a shaft opening defined by a hub 52. The output shafts 14 and 16 extend inwardly through the openings defined by the hubs 52 into the interior of the housing 40.

The bevel gear system 32 includes a pair of side gears 54 and 56 which are respectively connected to the splined ends 18 and 20 of the output shafts 14 and 16. Each side gear 54 and 56, therefore, is rotatable with, and slidably axially, with respect to its output shaft.

Each side gear includes a transverse inner face 58 disposed in spaced apart facing relation to the corresponding transverse inner face of the other side gear. The transverse inner face 58 of each side gear is provided with a recess 60 in the form of a counterbore adjacent the output shafts 14 and 16. Each recess 60 is sized to receive one of the C-clips 28, and serves to restrain outward movement of the output shafts 14 and 16.

The bevel gear system 32 further includes a pair of pinion gears 62 rotatably supported by a transverse extending pinion shaft 64. These gears are equidistant from the longitudinal center line of the output shafts 14 and 16 in intermeshing engagement with the side gears 54 and 56. The pinion shaft 64 extends transversely of the differential casing 30 between the ends of the shafts 14 and 16 and is secured to the casing by removable, partially threaded dowel pin 66.

Rotational effort received by the differential mechanism 10 is transferred through the pinion shaft 64 and pinion gears 62 to the output shafts 14 and 16 in a well-known manner. Additionally, when relative rotation between the output shafts is required, the bevel gear system 32 provides the necessary system flexibility.

Free differentiation between the output shafts 14 and 16 is restrained by the clutches 34 and 36 of the differential mechanism. The clutches 34 and 36 include truncated, cone-shaped clutch members disposed for frictional engagement with the surfaces 42 and 44, which comprise conically-shaped drums. Each cone-shaped clutch member 34 and 36 is provided with a splined inner bore 70 which engages the splined end of an output shaft so that the clutch is rotatable with an axially moveable with respect to its output shaft.

The clutches 34 and 36 need not be separate elements but may be integral with and part of the side gears 54 and 56. Also, clutch plates may be employed instead of cone clutches without departing from the scope of the invention.

The clutch members are disposed intermediate the side gears 54 and 56 and the hubs 52 of the casing and are in transverse abutting contact with the adjacent side gears.

Resistance to rotational effort is accomplished in a well-known manner. Transmission of torque from the pinion gears 62 to the side gears 54 and 56 creates separating forces urging the side gears axially outwardly in a direction away from the pinion shaft 66. These forces are transferred to the cone-shaped clutch members 34 and 36, which in turn, frictionally engage the surfaces 42 and 44 of the housing to provide a direct path for transmission of rotational effort to the output shaft to which the clutch member is connected. Thus, if a ground-engaging wheel should slip, the output shaft associated with the slipping wheel will experience a lack of resistance to torque. In normal open differentials, substantially all of the rotational effort of the differential will be transferred to the slipping wheel. In a limited slip differential, on the other hand, transmission of torque from the pinion gears 62 to the side gears 54 and 56 creates separating forces urging the side gears 54 and 56 axially outwardly in a direction away from the pinion shaft 64. The forces are transferred to the cone-shaped clutch members 34 and 36 to increase frictional engagement of the clutch members 34 and 36 with the surfaces 42 and 44 of the differential casing to provide a direct path for transmission of rotational effort to the output shaft to which the clutch member is associated.

Figure 3:
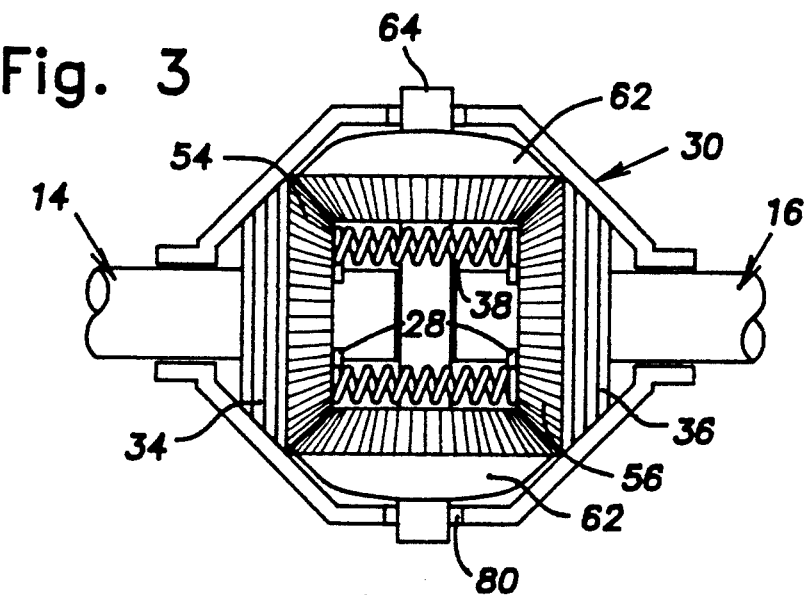
FIG. 3 is a schematic illustration of a differential, according to this invention, under normal driving conditions.
Figure 4:
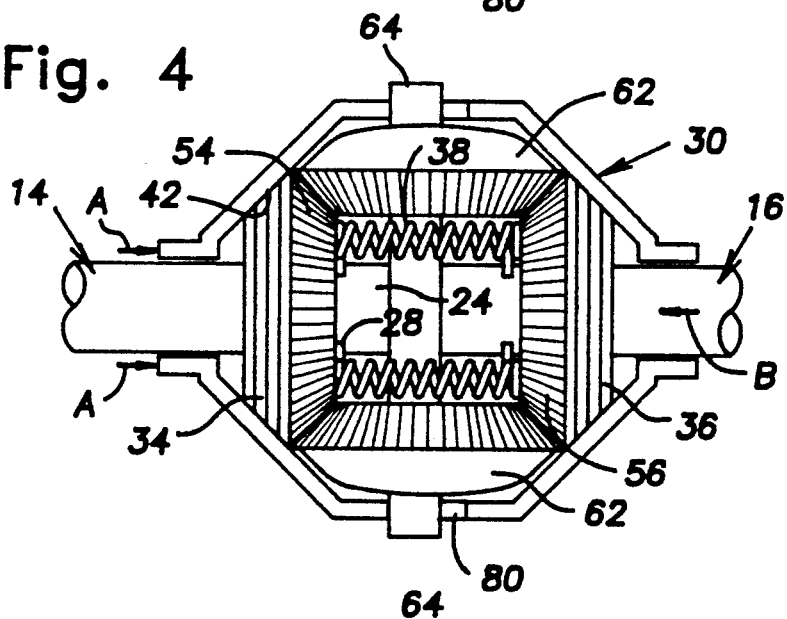
FIG. 4 is a schematic representation similar to FIG. 3, but showing the differential as it would appear and function during a hard left-hand turn, as viewed from the rear of the differential.
Figure 5:
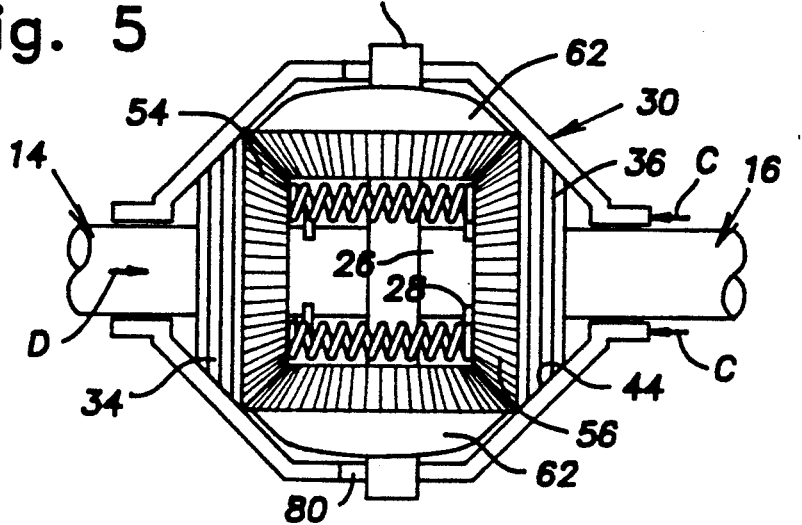
FIG. 5 is a view similar to FIG. 4, but showing the condition of the differential during a hard right-hand turn.

In addition to the conventional functions performed by the differential, according to this invention, the differential mechanism 10 is also responsive to inertia loads in the direction of the axis of the output shafts to control wheel slippage during tight turns. Referring now to FIGS. 3–5, the differential mechanism 10 is schematically illustrated to demonstrate the position of the components of the mechanism during normal, straight-ahead operations, and during hard turns. FIG. 3 illustrates the components of the differential under normal driving conditions. In FIG. 4, the components are illustrated in a position attained when the vehicle is experiencing a tight, left-hand turn. In such a turn, centrifugal forces on the vehicle and, therefore, the differential casing 30, produce centrifugal force components "A" on the casing 30. These forces are resisted by the ground-engaging wheels of the vehicle and are centripetal forces axially directed along the axis of the output shaft 16 and represented by the force "B". Since the side gear 56 and the clutch 36 are connected by a spline to the output shaft 16, these components remain in place under the influence of the springs 38. The output shaft 16 itself is driven inwardly to engage the pinion shaft 64, which in turn, engages the end face 24 of the output shaft 14. Movement of the pinion shaft 64 in a direction normal to its axis is permitted by an axial elongation E of a pinion shaft mounting hole 80, as may be seen most clearly in FIG. 2. The elongation of the hole 80 is exaggerated for clarity in the drawings. In this regard, the spacing between the C-clip 28 and the side gear 56, as shown in FIGS. 3–5 is, likewise, exaggerated to illustrate the principles of operation.

Forcing the pinion shaft 64 against the face 24 of the output shaft 14 causes force to be transmitted by the C-clip 28 against the side gear 54, and against the clutch 34 to cause increased pressure of the clutch 34 against the surface 42 as a function of that force. During a hard, left-hand turn, therefore, the ground-engaging wheel associated with the output shaft 14 may tend to lose traction by being lifted by a force which is a component of a centrifugal force "A", or may leave the ground entirely. Loss of traction, however, is resisted since the clutch 34 will be further engaged in the previously described manner.

Similarly, if the vehicle experiences a hard, right-hand turn, the forces on the output shafts and the differential housing are illustrated in FIG. 5. In FIG. 5, the output shaft 14 exerts an inwardly directed force D with respect to the casing 30 and is driven into engagement with the pinion shaft 64. This force is opposed by the force C acting on the housing 30. The pinion shaft 64 is permitted to shift in the mounting hole 80 to abut the end face 26 of the output shaft 16 and apply force to the output shaft 16, the C-clip 28, the side gear 56, and the clutch 36 relative to the surface 44, so that the pressure of the clutch 36 against the surface 44 is increased to provide a driving connection to the wheel associated with the output shaft 16 and the wheel associated with the output shaft 14 since differentiation is prevented.

Although the preferred embodiments of this invention have been shown and described, it should be understood that various modifications and rearrangements of the parts may be resorted to without departing from the scope of the invention as disclosed and claimed herein.

What is claimed is:

1. A limited slip differential for an axle system comprising first and second coaxially aligned, juxtaposed ends, a hollow differential casing including a pair of axially aligned apertures receiving said output shafts and defining an internal cavity surrounding said juxtaposed ends, a beveled gear system disposed within said cavity, said beveled gear system comprising first and second side gears respectively connected to said first and second output shafts for rotation therewith and axial movement with respect thereto, said beveled gear system further comprising at least a pair of pinion gears mounted on pinion shaft means for rotation about said shaft means, first and second restraining means respectively mounted between said first and second output shafts and each side gear mounted thereon limiting the amount of axial movement of each output shaft relative to the side gear mounted thereon in its own first direction, interference means extending between said juxtaposed ends to interfere with axial movement of said first and second output shafts in its own second direction opposite said first direction, clutch means disposed within said cavity and adapted to be connected to said shafts to resist differential action, said first output shaft being responsive to axially directed inertial forces to move said first output shaft relative to said casing in said second direction and to apply force to said interference means, said interference means being responsive to force applied by said first output shaft to move said second output shaft in its first direction to thereby move said second restraining means and said second side gear as a unit with said second output shaft, said clutch means being responsive to movement of said second side gear to connect said second output shaft to said casing to resist differential action.

2. A limited slip differential according to claim 1, wherein said abutment means comprises said pinion shaft.

3. A limited slip differential according to claim 1, wherein said clutch means comprises cone-shaped clutches positioned between said side gears and said differential casing.

4. A limited slip differential according to claim 3, wherein said pinion gears are mounted on pinion shaft means for rotation about said shaft means and wherein said shaft means is mounted in a pair of axially aligned openings in said differential casing, said openings being elongated along an axis parallel to the axis of said output shafts.

5. A limited slip differential for an axle system comprising first and second coaxially aligned, relatively rotatable output shafts including spaced apart juxtaposed ends, a hollow differential casing including a pair of axially aligned apertures receiving said output shafts and defining an internal cavity surrounding said juxtaposed ends, a beveled gear system disposed within said cavity, said beveled gear system comprising first and second side gears respectively connected to said first and second output shafts for rotation therewith and axial movement with respect thereto, said beveled gear system further comprising at least a pair of pinion gears mounted on pinion shaft means for rotation about said shaft means, first and second restraining means respectively mounted between said first and second output shafts and each side gear mounted thereon limiting the amount of axial movement of each output shaft relative to the side gear mounted thereon in its own first direction, said pinion shaft means extending between said juxtaposed ends to interfere with axial movement of said first and second output shafts in its own second direction opposite said first direction, clutch means disposed within said cavity and adapted to be connected to said shafts to resist differential action, means defining diametrically opposite apertures in said casing, said apertures receiving said pinion shaft means and being elongated to permit limited transverse movement of said pinion shaft means in said first and second directions, said first output shaft being responsive to axially directed inertial forces to move said first output shaft relative to said casing in said second direction and into abutment with said pinion shaft means, said pinion shaft means being responsive to abutment by said first output shaft to move said pinion shaft means laterally in said apertures and into abutment with said second output shaft, said second output shaft being responsive to abutment by said pinion shaft means to move said second output shaft in its first direction to thereby move said second restraining means and said second side gear as a unit with said second output shaft, said clutch means being responsive to movement of said second side gear to connect said second output shaft to said casing to resist differential action.

* * * * *

UNITED STATES PATENT AND TRADEMARK OFFICE
CERTIFICATE OF CORRECTION

PATENT NO. : 5,226,861

DATED : July 13, 1993

INVENTOR(S) : James L. Engle

It is certified that error appears in the above-identified patent and that said Letters Patent is hereby corrected as shown below:

Column 5, line 26, after "aligned," insert --relatively rotatable output shafts including spaced apart--.

Signed and Sealed this

Twenty-second Day of March, 1994

*Attest:*

BRUCE LEHMAN

*Attesting Officer*   *Commissioner of Patents and Trademarks*